US005484046A

United States Patent [19]
Alper et al.

[11] Patent Number: 5,484,046
[45] Date of Patent: Jan. 16, 1996

[54] WHEELED LUGGAGE CASE

[76] Inventors: Brad Alper, 4730 Stoetz La.; Richard Trevethick, 6103 Burnside Rd., both of Sebastopol, Calif. 95472

[21] Appl. No.: 420,292

[22] Filed: Apr. 11, 1995

Related U.S. Application Data

[63] Continuation-in-part of Ser. No. 80,982, Jun. 4, 1993, Pat. No. 5,407,039.

[51] Int. Cl.$^6$ .............................. A45C 5/14; A45C 13/26
[52] U.S. Cl. ...................... 190/115; 190/18 A; 190/117; 280/47.315; 280/655.1
[58] Field of Search .................... 190/18 A, 115, 190/117; 220/761, 764; 280/37, 47.27, 47.315, 655, 655.1

[56] References Cited

U.S. PATENT DOCUMENTS

| | | | |
|---|---|---|---|
| 2,042,387 | 5/1936 | Cobb | 190/18 A |
| 2,392,926 | 1/1946 | Kelly | 190/18 A |
| 4,284,287 | 8/1981 | Esposito | 280/655 |
| 4,286,796 | 9/1981 | Esposito | 280/655 |
| 4,407,521 | 10/1983 | Zeitlin | 280/655.1 |
| 4,460,188 | 7/1984 | Maloof | 280/30 |
| 4,550,813 | 11/1985 | Browning | 280/37 |
| 4,588,055 | 5/1986 | Chen | 190/115 |
| 4,756,394 | 7/1988 | Cohen | 190/18 A |
| 4,763,907 | 8/1988 | Raymond | 280/47.315 |
| 4,792,025 | 12/1988 | Thomas | 190/115 |
| 4,813,520 | 3/1989 | Lin | 190/18 A |
| 4,889,360 | 12/1989 | Havlovitz | 280/655.1 |
| 4,921,270 | 5/1990 | Schoberg | 280/655.1 |
| 4,966,259 | 10/1990 | Bergman | 190/115 |
| 5,114,164 | 5/1992 | Bothwell et al. | 190/18 A |
| 5,116,289 | 5/1992 | Pond et al. | 190/18 A |
| 5,127,662 | 7/1992 | Spak | 280/40 |
| 5,154,265 | 10/1992 | Capistrant | 190/18 A |
| 5,165,508 | 11/1992 | Kim | 190/115 |
| 5,181,590 | 1/1993 | Carpenter et al. | 190/115 |
| 5,207,440 | 5/1993 | Liang | 280/37 |
| 5,226,553 | 7/1993 | Fiore | 220/764 |
| 5,313,817 | 5/1994 | Meinders | 190/18 A |
| 5,330,037 | 7/1994 | Wang | 190/115 |
| 5,385,220 | 1/1995 | Pond et al. | 280/655.1 |

FOREIGN PATENT DOCUMENTS

2124589  2/1984  United Kingdom ................ 190/18 A

*Primary Examiner*—Gary E. Elkins
*Attorney, Agent, or Firm*—Harris Zimmerman

[57] ABSTRACT

A luggage case includes a luggage receptacle with an openable lid at the top and a plurality of wheels extendable from the undersurface to support the case in rolling translation along a surface. A handle assembly includes a pair of strut assemblies secured to opposed sides of the receptacle and a handle extending transversely between distal ends of the strut assemblies. The receptacle includes a first pair of channels formed in opposed sides of the receptacle to secure the strut assemblies in a retracted, storage position with the handle abutting one end of the case. A second pair of channels are formed in opposed sides of the receptacle to support the strut assemblies in an erected, operative position to enable pushing, pulling, and steering the case in rolling fashion. The first and second channels formed in each side intersect, and a pivot assembly at the intersection supports the proximal end of each strut assembly. Each pivot assembly includes a first pivot axis for enabling the strut assembly to be rotated between the first and second channels, and a second pivot axis for enabling the strut assembly to be rotated into and out of engagement with the channels.

12 Claims, 5 Drawing Sheets

FIG_1

FIG_2

FIG_3

FIG_4

FIG_5

Figure_9

Figure_11

Figure_10

Figure_12

Figure_13

Figure_14

Figure_15

5,484,046

WHEELED LUGGAGE CASE

REFERENCE TO RELATED APPLICATION

This application is a continuation-in-part of application Ser. No. 08/080,982, filed Jun. 4, 1993, now U.S. Pat. No. 5,407,039, issued Apr. 18, 1995.

TECHNICAL FIELD

This invention relates to traveler's luggage cases and more particularly to luggage cases which are equipped with wheels to facilitate movement of the case along a floor, walkway or the like.

BACKGROUND OF THE INVENTION

Lifting and manually carrying luggage at airports, railway stations, hotels or other sites is a task which is generally disliked by travelers. Rental luggage carts are available at certain sites of this kind but the renting process is itself an inconvenience and such carts do not remain with the traveler after the baggage is checked in. Air travelers, including aircraft crew members must typically walk a sizable distance after leaving the baggage check in area and the rental cart is no longer available for the purpose of transporting carry-on luggage cases at such times.

Heretofore, much use has been made of wheeled luggage carriers which typically have a light weight and foldable construction to facilitate handling and storage of the device when it is not in use. Prior U.S. Pat. No. 5,127,662 discloses one example of a carrier of this type.

Such carriers are essentially small hand trucks of the type which have a platform on which the luggage case is rested, a pair of wheels which extend below one edge region of the platform and a handle which extends upward from the edge region. The user grasps and tilts the handle to lift the platform and luggage case upward from the underlying floor or the like and the carrier may then be pulled or pushed to the destination of the case. Such carriers are helpful but are not entirely free of inconveniences of their own.

The carrier is not self stabilized and it is not entirely self supporting during movement. A person who is pulling or pushing such a carrier must continually exert additional effort in order to hold the carrier at the tilted orientation that enables it to be traveled along the floor or other surface. In the absence of such effort by the user, gravity pivots the carrier until either the platform or the handle itself contacts the floor.

When the luggage case is removed from the carrier the carrier itself becomes essentially still another separate piece of luggage which the traveler must contend with.

The instability of such a carrier when it is tilted to the traveling orientation and the pivoting movement which occurs when the handle is released make it unsatisfactory for certain purposes such as for transporting a small child along with a luggage case.

Efforts have heretofore been made to make the luggage case itself wheelable without the aid of a separate carrier. This typically consists of providing caster wheels at the surface of the case that faces downward when the case is in an upright position. A typical case in that position is substantially higher than it is wide and can easily topple over if it is not maneuvered with a great deal of precision. The person pulling such a case may have to lean over into an awkward posture.

Prior U.S. Pat. No. 5,116,289 discloses a luggage case with a pair of wheels and a built in retractable handle which can be extended to facilitate movement of the case. When the handle is extended, the unit may be tilted about the wheels and be operated in essentially the same manner as the previously discussed luggage case carriers. Thus the unit is subject to the previously discussed limitations of prior carriers.

The present invention is directed to overcoming one or more of the problems discussed above.

SUMMARY OF THE INVENTION

In one aspect, the invention provides a wheeled luggage case having a receptacle and an overlying lid which forms a luggage compartment, first and second downward extending wheels situated at opposite side regions of the receptacle in proximity to one end of the receptacle and a pivotable handle for facilitating travel of the case along a supporting surface. At least one downward extending additional wheel is situated in proximity to the other end of the receptacle. The luggage case further includes pivot means for enabling pivoting of the handle between an inactive orientation at which the handle extends along the receptacle and an active orientation at which the handle is included when each of the wheels is in contact with the supporting surface and at which the handle extends to a location which is both vertically and horizontally spaced apart from the receptacle.

In another aspect, the invention provides a wheeled luggage case having a receptacle which forms a luggage compartment. A lid overlays the receptacle and is hinged to the receptacle to enable pivoting of the lid between open and closed positions. First and second wheels are disposed at opposite sides of the luggage receptacle in proximity to the back end wall of the receptacle and a plurality of additional wheels are disposed in proximity to the front end wall. A handle has a pair of spaced apart coplanar pivotable arms with first ends that are pivoted to opposite sides of the receptacle and second ends that are linked by at least one cross member, the first ends being closer to the back end wall of the receptacle than to the front end wall. Each of the arms has telescoped members which are slidable in an axial direction relative to each other enabling the cross member to be moved towards the receptacle and outward from the receptacle. The case further includes latching means for selectively holding an inactive orientation at which the pivotable arms extend along opposite sides of the receptacle and the cross member extends along the front end wall. The latching means also provides for selectively holding the arms at an active position at which the arms are included when each of the wheels fire in contact with the supporting surface and at which the arms extend to a location which is both vertically and horizontally spaced apart from the back end wall of the receptacle.

In a further aspect, a handle assembly includes a pair of strut assemblies secured to opposed sides of the receptacle and a handle extending transversely between distal ends of the strut assemblies. The receptacle includes a first pair of channels or the like formed in opposed sides of the receptacle to secure the strut assemblies in a retracted, storage position with the handle abutting one end of the case. A second pair of channels are formed in opposed sides of the receptacle to support the strut assemblies in an elected, operative position to enable pushing, pulling, and steering the case in rolling fashion. The first and second channels formed in each side intersect, and a pivot assembly at the intersection supports the proximal end of each strut assembly. Each pivot assembly includes a first pivot axis for enabling the strut assembly to be rotated between the first and second channels, and a second pivot axis for enabling the strut assembly to be rotated into and out of engagement with the channels.

The invention greatly facilitates manual movement of a luggage case. The user need not exert any effort for the purpose of assisting the wheels in the support of the case or for the purpose of holding the case in a tilted orientation against the force of gravity. Release of the handle while on a level surface does not require that the user manipulate the case into a different orientation. The user may walk with a normal upright posture while simply pushing the wheeled case in a manner comparable to the pushing of a baby stroller. Structural elements which provide for these results are permanent components of the case itself and, when not in use, can be manipulated into a compact configuration that conforms substantially with the shape of the luggage receptacle. As the construction is self supported, self stabilized and does not change orientation during movement, a small child may be safely transported without discomfort by disposing a child seat on the luggage receptacle and by fastening the seat in place.

The invention, together with further aspects and advantages thereof, may be further understood by reference to the following description of the preferred embodiments and by reference to the accompanying drawings.

DETAILED DESCRIPTION OF THE PREFERRED EMBODIMENT

Figure 1:
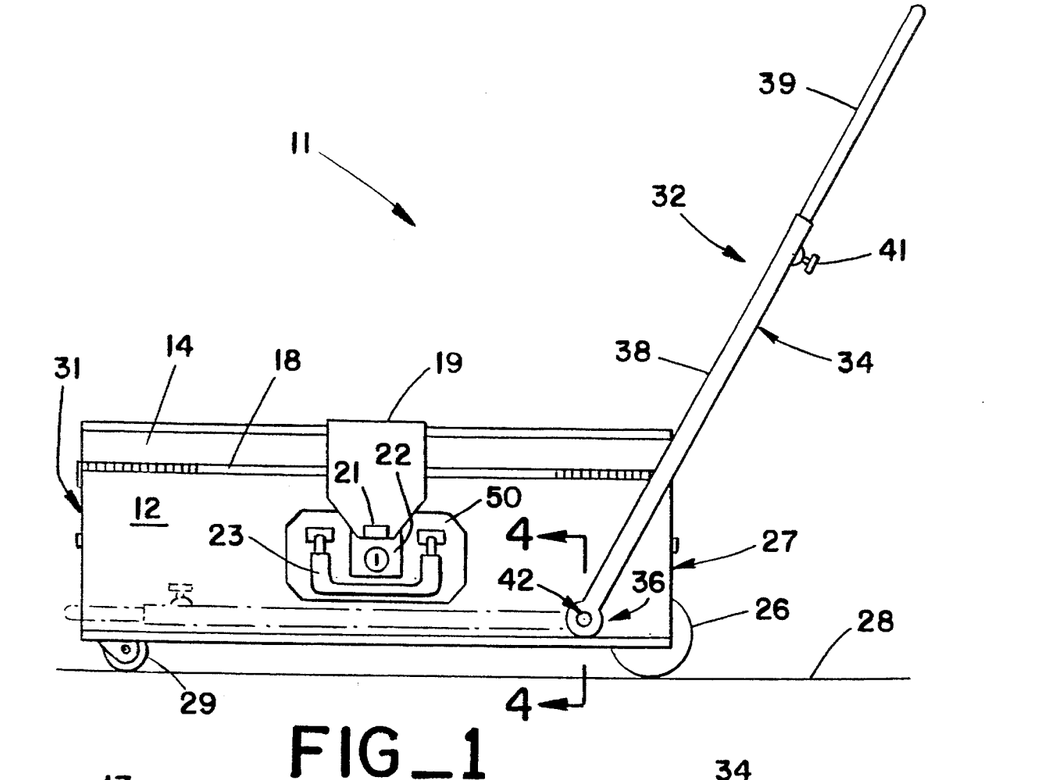
FIG. 1 is a side elevation view of a wheeled luggage case which embodies the invention.
Figure 2:
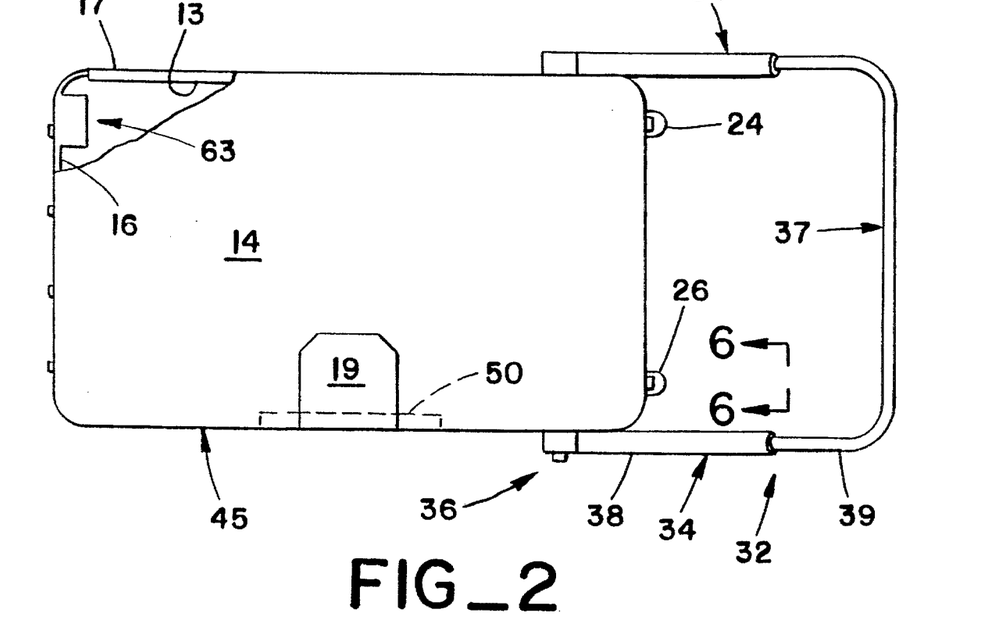
FIG. 2 is a top view of the luggage case of FIG. 1.

Referring initially to FIGS. 1 and 2 of the drawing in conjunction, a wheeled luggage case 11 in accordance with this embodiment of the invention has luggage receptacle 12 forming a luggage compartment 13 and a lid 14 which spans the top of the compartment when the case is closed. Receptacle 12 and lid 14 may jointly have the general configuration and construction of a typical traveler's suitcase except for the specialized structural features which will be hereinafter described.

Thus, in this particular example, the receptacle 12 and lid 14 jointly have a generally rectangular configuration. Both such components are formed of durable fabric and a rigid conforming pan shaped frame 16 is situated within the lower region of receptacle 12 to enable attachment of components which will hereinafter be described. The case 11 may, of course, have other shapes and be formed of other materials. The case 11 of this example is proportioned to be a carry on case which may be carried into an aircraft by the traveler but the invention is equally adaptable to larger luggage cases.

It is preferred, although not essential in all cases, that the luggage receptacle 12 and lid 14 jointly have a length and a width which both exceed their height as this provides for maximum stability.

In this example, one edge of the lid 14 is fastened to the corresponding upper edge of receptacle 12 by a flexible fabric hinge strip 17 and a zipper 18 extends around the other mating edges of the case 11 to provide for opening and closing of the case. A flexible locking flap 19 is secured to the lid 14 and has a clasp 21 at the end which engages with a lock 22 of the known form at the side wall of the receptacle 12 that is opposite from the hinge strip 17. While the case 11 is designed to the wheeled along a floor, walkway or the like, it is preferably provided with a convention hand grip 23 to enable carrying of the case when it is being moved for only a short distance. The invention is equally adaptable to luggage cases which have other forms of hinges, closures, latching means and provisions for carrying the case.

Figure 3:
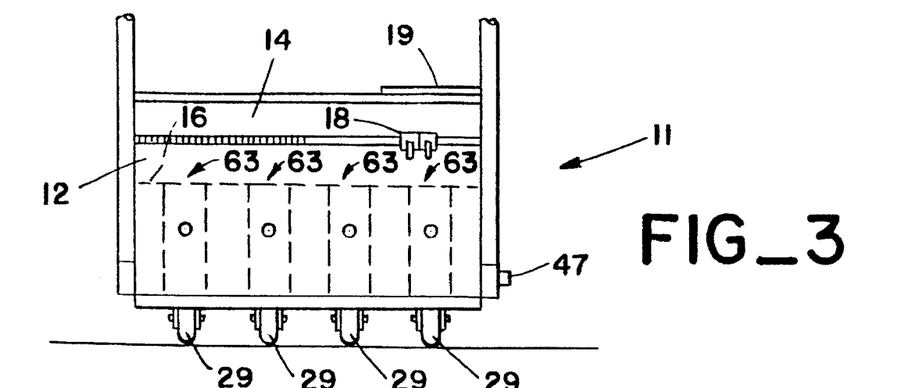
FIG. 3 is a front end elevation view of the luggage case of the preceding figures.

Spaced apart first and second wheels 24 and 26 are disposed at opposite side regions of the case 11 is proximity to the back end wall 27 of receptacle 12 and extend downward to contact the supporting surface 28. Referring jointly to FIGS. 1 and 3, additional wheels 29 extend downward from receptacle 12 at a location which is close to the front end wall 31 of the receptacle. Wheels 29 are preferably of the caster type which can pivot about an offset vertical pivot axis in order to self adjust to turns in the path of travel of the case 11.

While it is possible to provide only a single additional wheel 29, centered between the sides of the case 11, it is preferable to provide a larger number as this adds to the stability of the case during travel and enables use of small light weight wheels. In this example there are four such additional wheels 29 arranged in a row which extends transversely along the underside of the case 11.

The wheels 24, 26, and 29 are preferably retractable in the upward direction to reduce the size of the case 11 when it is stored away and to enable the undersurface of receptacle 12 to be rested directly on a supporting surface when that is desired. Structure for attaching the wheels 24, 26 and 29 to the receptacle 12 is a retractable manner will hereinafter be described.

Referring again to FIGS. 1 and 2 in conjunction, a generally U-shaped pivoting handle 32 enables the traveler to push the case 11 while walking with a normal upright posture. The handle has a pair of coplanar parallel arms 34 which have first ends pivoted to opposite sides of receptacle 12 by a pivot coupling 36 situated at the lower portion of the receptacle at a location which is closer to the back end wall 27 than to the front end wall 31. The opposite ends of arms 34 are linked by a cross member 37 which is grasped by the user during travel of the case 11.

Handle 32 is extendible and contractible as each arm 34 is formed by two telescoping members 38 and 39. Thumbscrews 41 on each member 38 may be tightened to lock the arms 34 at a selected degree of extension.

Latching means 42 provide for latching the handle 32 at either of an inclined active position at which it extends to a location that is both vertically and horizontally spaced from the receptacle 12 as shown by solid lines in FIG. 1 and an inactive position at which it extends along the sides of the receptacle as shown by dashed lines. At the inactive position, cross member 37 may be traveled into abutment with the front end wall 31 of receptacle 12 by temporarily loosening thumbscrews 41. At the inactive position, the handle 32 conforms with the receptacle 12 and does not interfere with storage of the case 11 in restricted spaces.

Figure 4:
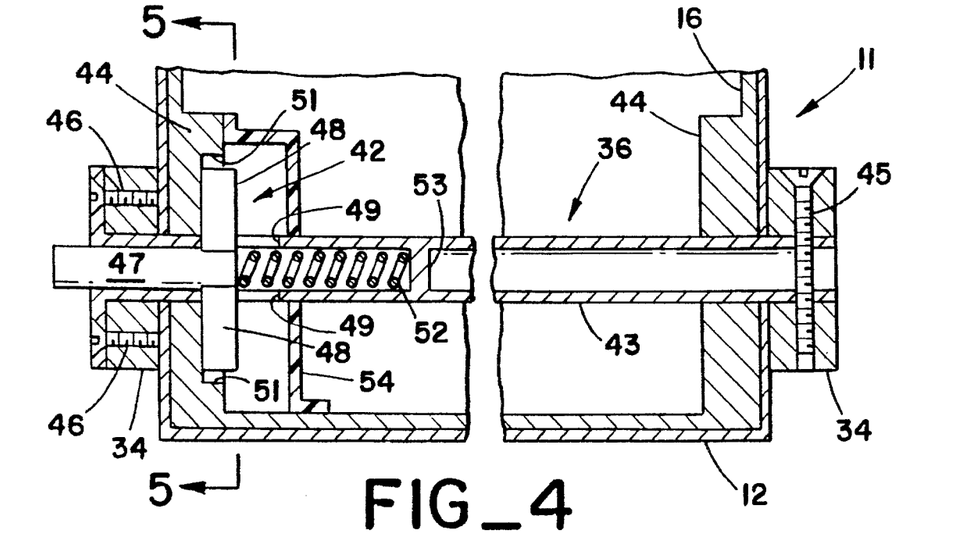
FIG. 4 is a foreshortened cross section view taken along line 4—4 of FIG. 1 and which shows mechanism for latching the handle of the luggage case at an active position and at an active position.
Figure 5:
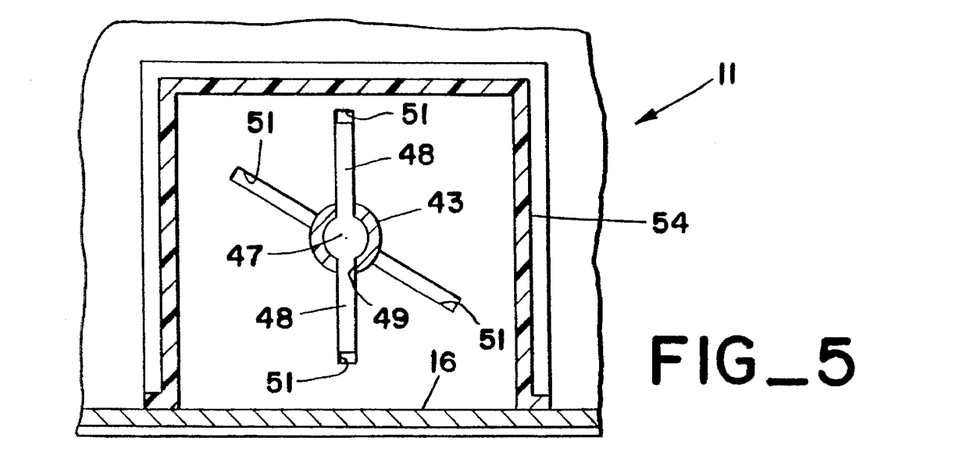
FIG. 5 is a section view taken along line 5—5 of FIG. 4 further illustrating the handle latching mechanism.

With reference jointly to FIGS. 4 and 5, the pivot coupling 36 is formed by a hollow tubular rotatable shaft 43 which extends transversely across receptacle 12 and through thickened regions 44 of the frame 16. Shaft 43 extends through the adjacent end of each arm 34 and is constrained to turn with the arms, when the arms are pivoted, by screws 45 and 46 which secure the arms to the ends of the shaft.

Latching means 42 may take a variety of forms. In the present example, a short, axially slidable rod 47 is disposed in one end of shaft 43 and has an end that protrudes from the end of the shaft and from the end of the adjacent arm 34. Rod 47 has a pair of tangs 48 which extend radially from the rod in opposite directions through slots 49 in the wall of shaft 43. Tangs 48 are seated in grooves 51 formed in the adjacent thick region 44 of frame 16. A compression spring 52 within shaft 43 is compressed between rod 47 and a partition 53 in the shaft and thus acts to urge the tangs 48 into the grooves 51. When seated in this manner, the tangs 48 prevent turning of shaft 43 and thereby prevent pivoting of handle arms 34. The arms 34 can be unlatched, when it is desired to pivot the arms between active and inactive positions, by momentarily depressing the protruding end of rod 47 against the force of spring 52. This withdraws tangs 48 from grooves 51 enabling turning of the shaft 43 and thus pivoting of arms 34. A small housing 54 in the luggage receptacle 12 isolates the latching means 42 from the contents of the receptacle to prevent interference with the operation of the mechanism.

As shown in FIG. 5, there are two pairs of grooves 51 which have angular orientations that enable seating of tangs 48 at either of the previously described active and inactive positions of the arms 34. The pairs of grooves 51 provide for 120° of angular movement of the arms 34 between the two positions in this example of the invention.

Referring again to FIGS. 1 and 2, the pivoting arms 34 are preferably disposed against the side walls 45 of luggage receptacle 12 when in the inactive position as this minimizes the bulk of the case at such times. To enable pivoting of the arms under this condition, hand grip 23 is pivotable and may be seated in a recess 50 in the side wall 45 latch 21, lock 22 and the vertically extending part of locking flap 19 are also within the recess. As the pivoting arms 34 extend along the lowermost portion of receptacle 12 when in the inactive position, the arms do not interfere with use of hand grip 23, operation of lock 22 and zipper 18 or opening and closing of lid 14.

Figures 6, 7:
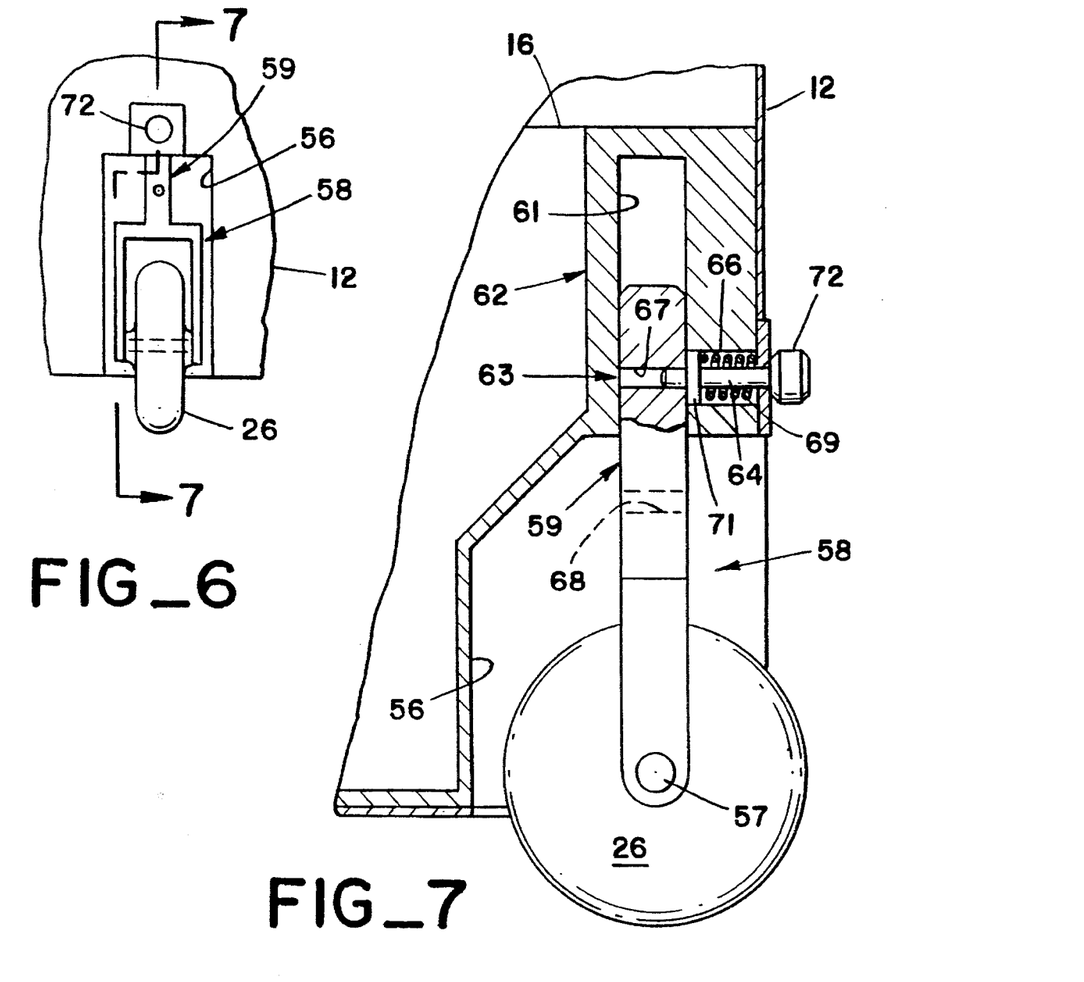
FIG. 6 is an elevation view of a portion of the back end of the luggage case taken along line 6—6 of FIG. 2.
FIG. 7 is a vertical section view taken along staggered line 7—7 of FIG. 6 and showing mechanism which enables selective retraction of the wheels of the luggage case.

Referring jointly to FIGS. 6 and 7, selective retraction of the wheels, such as wheel 26, can be arranged for in a number of different ways. In this example, wheel 26 is partially situated in an alcove 56 formed in frame 16 and which opens at both the underside and the back end of receptacle 12. The axle 57 of wheel 26 engages a fork 58 having a shank 59 that extends up into a vertical passage 61 in another thickened region 62 of frame 16. Shank 59 and passage 61 preferably have conforming square cross sections to prevent turning of the shank. Passage 61 is of sufficient length to enable raising of the wheel 26 to the point where the lower edge of the wheel is at or above the level of the underside of receptacle 12. To hold the wheel 26 at the raised position or at the lowered position, the retraction means 53 includes a pin 64 which extends through a passage 66 in frame region 62 and which may be entered into either of a pair of bores 67 and 68 in the shank. Bore 67 is located to be in register with pin 64 when wheel 26 is in the lowered position and bore 68 registers with the pin at the raised position of the wheel. A compression spring 69 acts against a flange 71 on pin 64 to resist withdrawal of the pin from the bore 67 or 68 and a knob 72 at the protruding end of the pin facilitates retraction of the pin when it is desired to raise or lower the wheels.

Referring again to FIG. 3, the additional wheels 29 are each provided with retraction means 63 which may be similar to that described above in connection with the rear wheels.

Figure 8:
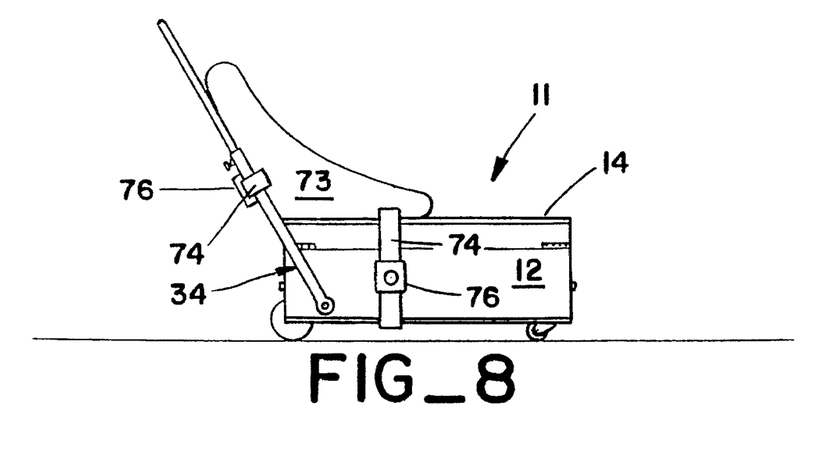
FIG. 8 is another side elevation view of the luggage case of the preceding figures and depicts arrangements for transporting an infant on the case.

Referring to FIG. 8, the self supporting and self stabilizing characteristics of the wheeled luggage case 11 make it suitable for transporting an infant in addition to the contents of the case For this purpose, a child seat 73 may be disposed on top of lid 14 and be secured to the case 11 by straps 74 having buckles 76. Preferably the seat 73 is secured by two such straps, one of which extends around the luggage receptacle 12 and the other of which extends around handle arms 34.

With regard to FIGS. 9–15, a further embodiment of the invention includes some components similar to the previous embodiments, and are labeled with similar reference numerals having a prime (') designation. A wheeled luggage case 11' in accordance with this embodiment of the invention has a luggage receptacle 12' forming a luggage compartment and a lid 14' which spans the top of the compartment when the case is closed. The receptacle 12' and lid 14' jointly have a generally rectangular configuration, although other configurations are possible and known in the prior art. A rigid conforming pan shaped frame 16' is situated within the lower region of receptacle 12 to enable attachment of components which will hereinafter be described. Details of the lid closure arrangement, grip, and mounting of wheels to support the case in rolling translation are substantially similar to the previous embodiments, and are not repeated herein.

Figure 9:
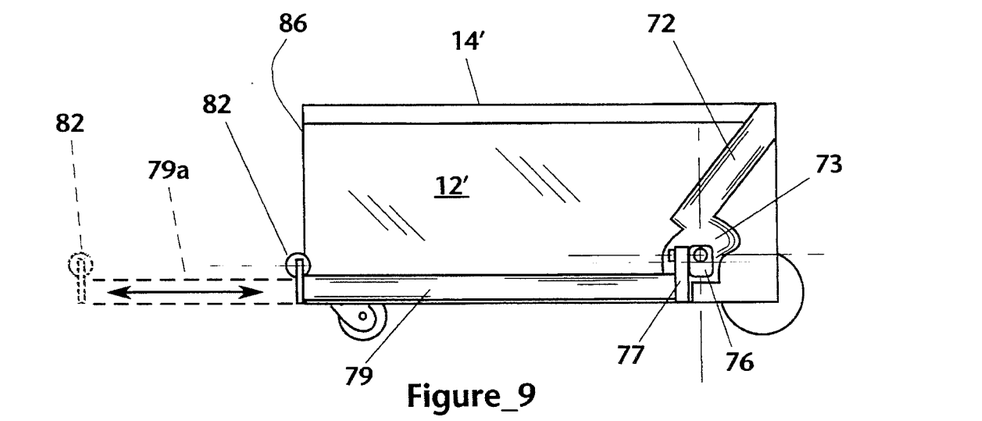
FIG. 9 is a side elevation of a further embodiment of the wheeled luggage case of the invention, shown with the handle assembly in a retracted disposition.
Figures 10, 11:
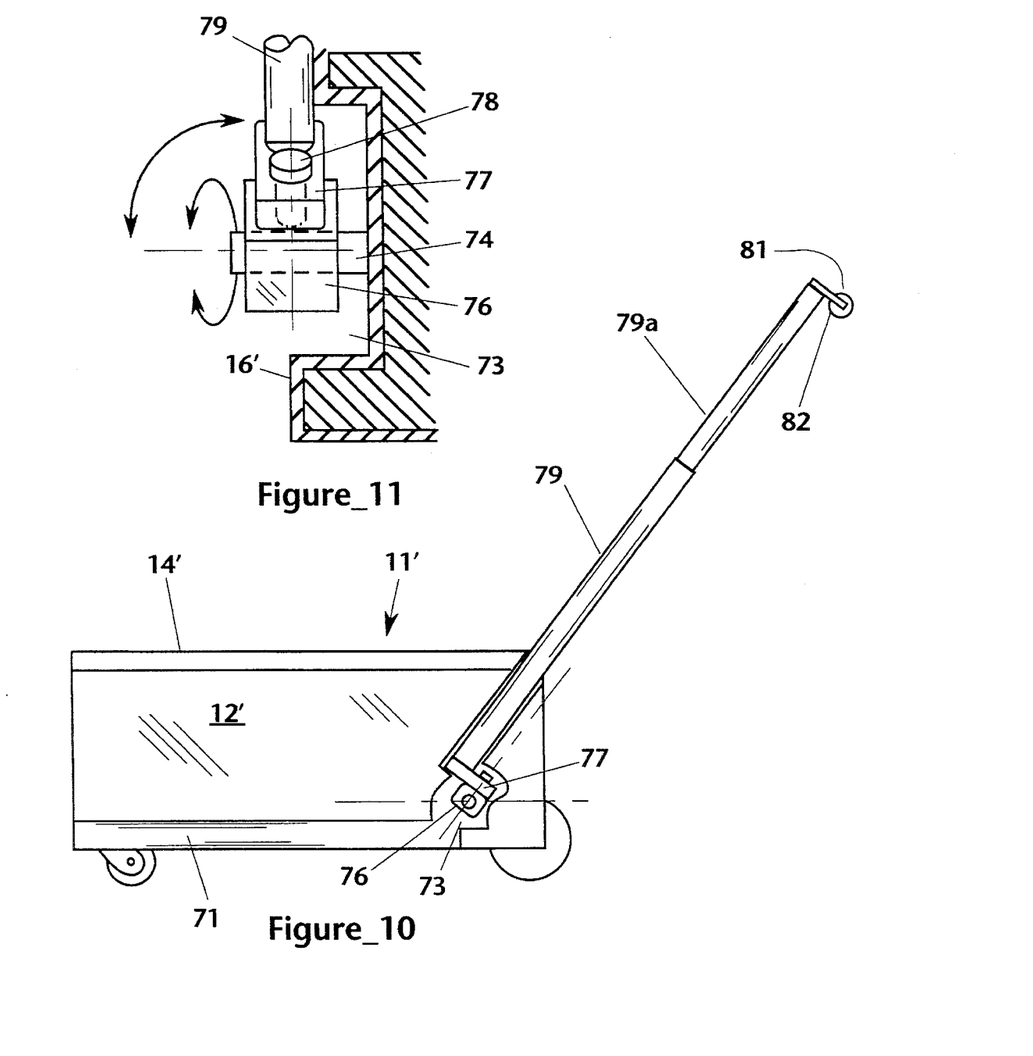
FIG. 10 is a side elevation of the wheeled luggage case of FIG. 9, shown with the handle assembly deployed and extended.
FIG. 11 is an enlarged, partially cutaway elevation of the handle mounting assembly, taken along line 11—11 of FIG. 10.
Figure 13:
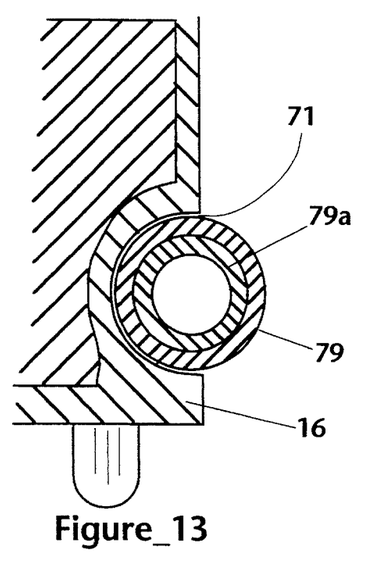
FIG. 13 is an enlarged cross-sectional view of the handle storage arrangement of the wheeled luggage case of FIGS. 9–12.

The case is provided with a first pair of channels 71 extending along lower edges of opposed sides of the receptacle 12', as shown in FIG. 10. The channels are preferably formed integrally in the frame 16', as shown in FIG. 13. A second pair of channels 72 are formed in opposed sides of the receptacle 12', extending obliquely upwardly adjacent to one end of the receptacle, as shown in FIG. 9. The channels 71 and 72, which are formed as indentations in each side, are joined by a recessed portion 73.

Extending outwardly from each recessed portion 73 is a pivot shaft 74, as shown particularly in FIG. 11. A mounting block 76 is secured to the shaft 74, and one end of a link 77 is joined to the block 76 by a pin 78 in rotatable fashion. The pin 78 extends generally orthogonally to the shaft 74, so that the link 77 pivots about an axis perpendicular to the pivot axis of shaft 74. Joined to the other end of each link 77 is one end of a telescoping strut assembly 79. The strut assembly 79 may alternatively be joined to the pivot shaft 74 by a standard clevis member, as shown hereinafter.

Figure 12:
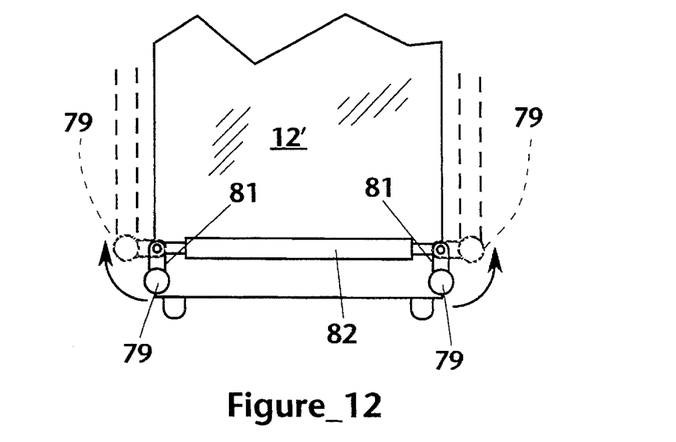
FIG. 12 is a partial top view of the wheeled luggage case of FIGS. 9–11.
Figure 14:
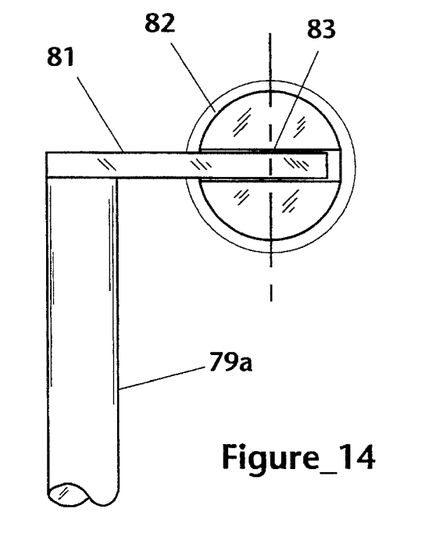
FIG. 14 is an enlarged fragmentary view of the handle swivel assembly.

The strut assembly 79 includes an inner telescoping tube 79a that is extendable and retractable therewithin. Extending between opposed tubes 79a is a handle 82, as shown in FIG. 12. A link 81 is secured fixedly to the outer end of each tube 79a, as shown in FIG. 14, and joined to one end of the handle 82 by a pivot pin 83. The strut assembly 79 is thus pivotable from the handle 82 about the axis of pivot pin 83 that is disposed generally coaxially with the axis of pin 78 that secures the strut assembly to the mounting block.

As shown in FIGS. 9 and 13, each strut assembly 79 is dimensioned to be received in a respective channel 71 for storage in a retracted, inactive disposition. In such disposition the strut assemblies 79 are retracted, and the handle 82 may abut the adjacent end wall 86 of the receptacle 12'. The end wall 86 may be provided with a further channel extending between like ends of the channels 71 to received the handle 82 in a more recessed disposition.

The strut assemblies 79 may be secured in the channels 71 by any of several retention means known in the prior art. For example, the strut assemblies and channels 71 may be dimensioned so that they snap-engage, or spring detents may be provided in the channels to releasably secure the strut assemblies. Likewise, magnets may be secured within the channels and within the strut assemblies and positioned to be brought into close proximity when the strut assemblies are placed within the channels. Alternatively, the strut assemblies may be resiliently biased to pivot toward the channels 71 by torsional springs incorporated into the assemblies of the links 77 and mounting blocks 76. Likewise, an elastic web extending within the handle 82 may be secured between the two opposed links 81 and arranged to rotate the links 81 to move the strut assemblies toward the receptacle 12'.

It may be appreciated that the recess 73 provides clearance for the mounting block assembly 76–78 to rotate about the shaft 74 and move the strut assemblies 79 from their storage positions in the channels 71 to be deployed in their active positions engaged in channels 72. To accomplish this maneuver, the telescoping tubes 79a are extended, as shown in broken line in FIG. 9, and the strut assemblies 79 are rotated out of the channels 71, as shown in broken line in FIG. 12. The strut assemblies are then pivoted about the shafts 74 until they engage the channels 72, in which they are secured by the same means that secure the strut assemblies in the channels 71. The engagement of the strut assemblies in the channels 72 secures and maintains the handle 82 in a position above and to the rear of the case, so that an individual may push (or pull) the case in rolling translation while steering the unit The unit is thus transportable without lifting, using a minimum of motive effort.

To store the handle after use, the deployment process is reversed by rotating the strut assemblies out of the channels 72, pivoting the strut assemblies about the shafts 74, rotating and placing the strut assemblies in the channels 71, and retracting the tubes 79a to return the handle 82 to an abutting relationship to the end wall 86 of the case.

It may be noted that the channels 71 and 72 serve not only to store the strut assemblies and hold the strut assemblies and handle in an active position for transporting the case, respectively, they also act as reinforcing structures within the frame to impart greater strength and durability. Additionally, the channels 71 may be provided in the embodiment shown in FIGS. 1 and 2 to accommodate the strut assemblies and handle within the profile of the case and reduce the overall dimensions.

Figure 15:
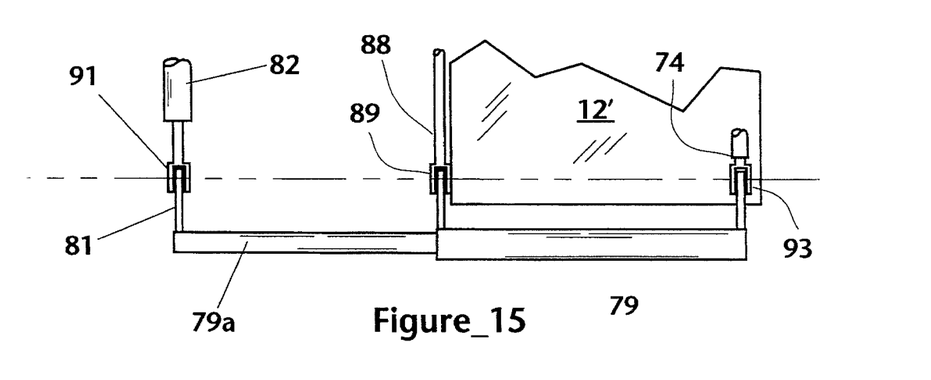
FIG. 15 is a partial top view of a further embodiment of the wheeled luggage case, showing an extendable handle assembly with a cross-brace.

With reference to FIG. 15, in a further embodiment of the invention a cross-brace assembly may be provided to join like ends of the strut assemblies 79. A link 87 extends from the end of each outer tube of the strut assembly, and is joined to a medial brace member 88 by a pivoting clevis assembly 89. The opposed end of the strut assembly 79 is secured to the pivot shaft 74 by another clevis assembly 93, and the distal end of the tube 79a is secured to the handle 82 by a further clevis assembly 91. All of the clevis assemblies 89, 91, and 93 are disposed so that they pivot about a common axis to permit the strut assembly to rotate easily into and out of engagement with the channels 71 and 72. The cross-brace stabilizes the strut assemblies and provides greater lateral control and steering ability to the case.

While the invention has been described with respect to a single preferred embodiment for purposes of example, many modifications and variations of the construction are possible and it is not intended to limit the invention except as defined in the following claims.

We claim:

1. A wheeled luggage case equipped for rolling translation along a supporting surface, comprising:

a luggage receptacle shaped to define a luggage compartment and having a front end wall and a back end wall and a pair of opposed side walls joining said front and back end walls;

a lid overlying said receptacle and being hinged thereto to enable pivoting of said lid between an open and a closed position;

a plurality of wheels extendable from said receptacle to engage a supporting surface in rolling contact;

handle means for enabling pushing, pulling and steering said luggage case along a supporting surface;

said handle means including a pair of strut assemblies having like first ends joined to a handle assembly extending generally transversely between said pair of strut assemblies;

a first pair of channels formed in said opposed side walls and extending generally parallel to said lid;

a second pair of channels formed in said opposed side walls and extending obliquely upwardly with respect to said first pair of channels;

each of said first pair of channels being disposed to intersect a respective one of said second pair of channels;

said first and second pair of channels adapted to receive said pair of strut assemblies;

means for selectively moving said pair of strut assemblies from a first position in which each strut assembly is secured in one of said first channels in a retracted, storage disposition, to a second position in which each strut assembly is secured in a respective, intersecting one of said second pair of channels and maintained by said second pair of channels in an extended, operative, erected disposition to enable pushing, pulling, and steering said luggage case in rolling translation.

2. The wheeled luggage case of claim 1, wherein said means for selectively moving said pair of strut assemblies includes a pair of pivot assemblies, each disposed at the intersection of respective first and second channels, said pair of strut assemblies including like second ends, each of said second ends joined to one of said pivot assemblies.

3. The wheeled luggage case of claim 2, wherein each pivot assembly includes means for rotating about a first pivot axis to move a respective strut assembly between respective first and second channels.

4. The wheeled luggage case of claim 3, wherein each pivot assembly includes means for rotating about a second pivot axis for moving a respecting strut assembly into and out of engagement with said respective first and second channels.

5. The wheeled luggage case of claim 4, wherein said first and second pivot axes are disposed in generally orthogonal relationship.

6. The wheeled luggage case of claim 4, further including means for joining said like first ends of said pair of strut assemblies to said handle assembly in pivoting fashion.

7. The wheeled luggage case of claim 1, further including means for extending each of said pair of strut assemblies in telescoping fashion.

8. The wheeled luggage case of claim 7, wherein said means for extending includes an inner tube slidably disposed within an outer tube, said first ends of said strut assemblies comprising like ends of said inner tubes.

9. The wheeled luggage case of claim 8, further including a cross-brace member extending between said outer tubes to strengthen said handle means.

10. The wheeled luggage case of claim 9, further including means for joining said cross-brace member to said outer tubes in pivoting fashion.

11. The wheeled luggage case or claim 1, wherein said first and second pairs of channels are formed in recessed fashion in said opposed side walls.

12. The wheeled luggage case of claim 2, wherein said pivot assemblies are disposed generally closer to said back end wall and said handle means is disposed generally abutting said front end wall when in said first position.

* * * * *